L. L. VIKTUREK.
ENGINE GUIDE.
APPLICATION FILED SEPT. 13, 1916.
1,234,427.
Patented July 24, 1917.
2 SHEETS—SHEET 2.
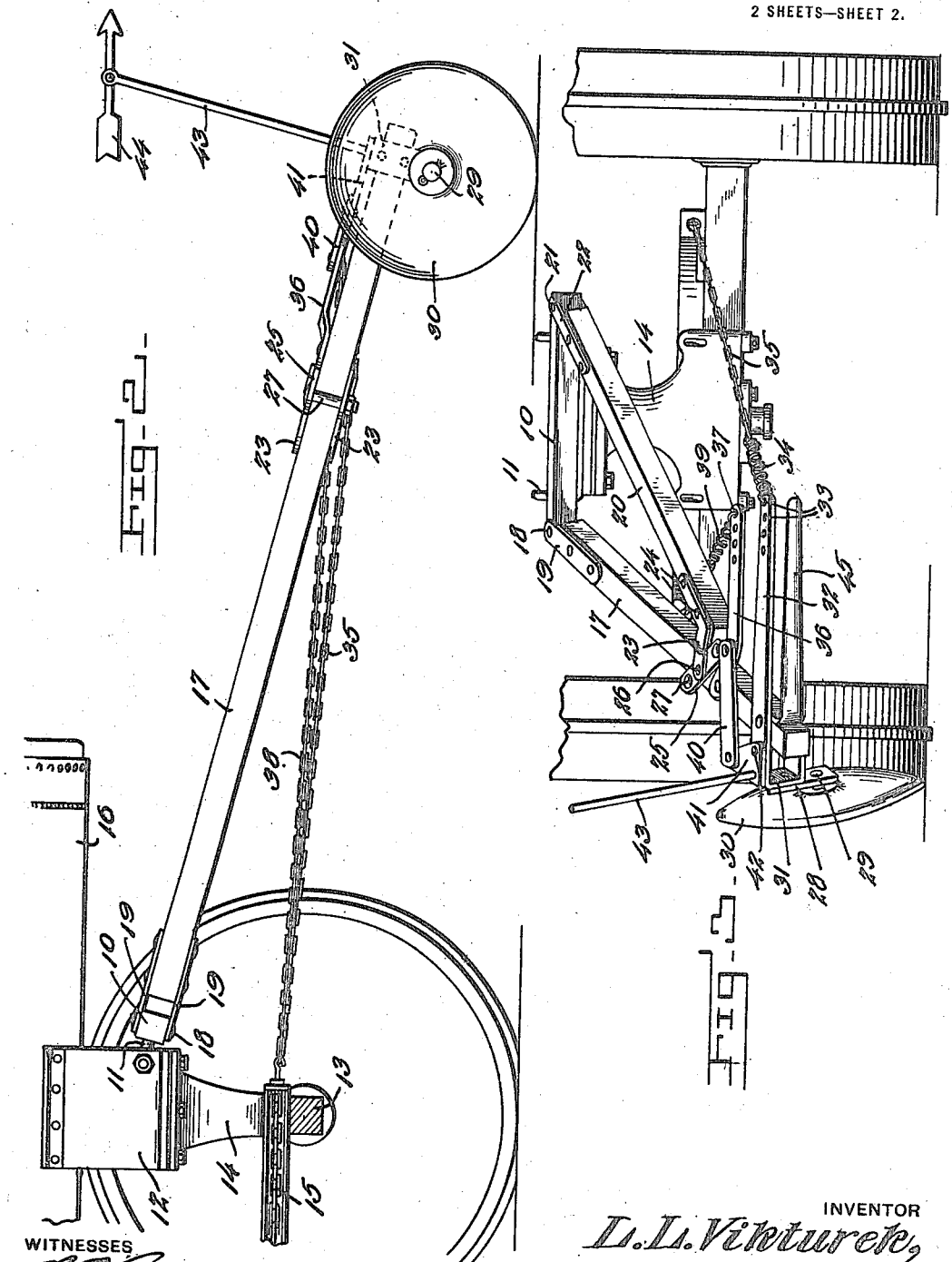
INVENTOR
L. L. Vikturek,
WITNESSES
BY
ATTORNEY

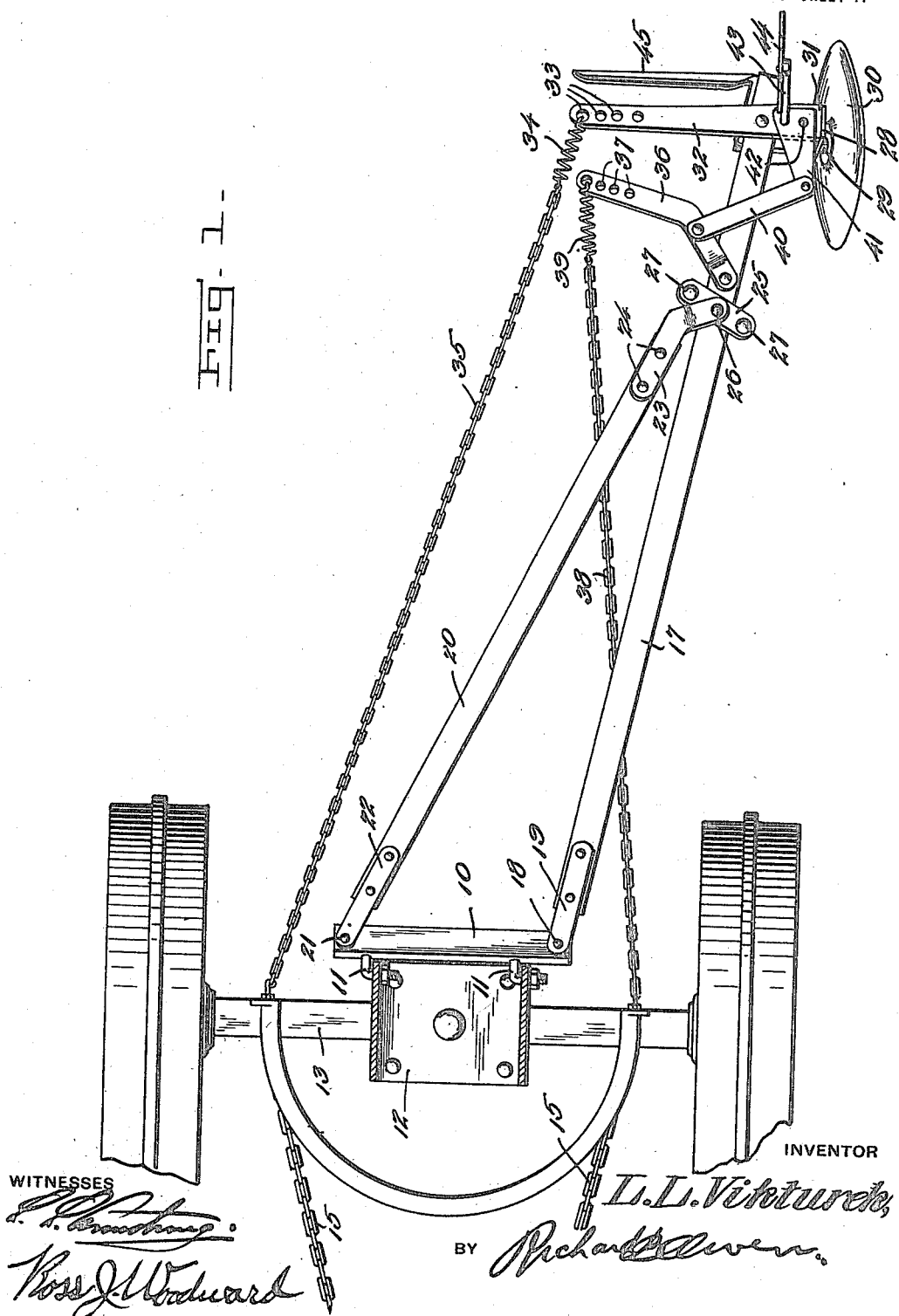

UNITED STATES PATENT OFFICE.

LEOPOLD L. VIKTUREK, OF CHOKIO, MINNESOTA.

ENGINE-GUIDE.

1,234,427. Specification of Letters Patent. Patented July 24, 1917.

Application filed September 13, 1916. Serial No. 119,901.

*To all whom it may concern:*

Be it known that I, LEOPOLD L. VIKTUREK, a citizen of the United States, residing at Chokio, in the county of Stevens and State of Minnesota, have invented certain new and useful Improvements in Engine-Guides, of which the following is a specification.

This invention relates to an improved guide for a traction engine and the principal object of the invention is to provide a guide attachment so constructed that it may be connected with the forward axle of a traction engine such as is used in connection with gang plows and serve to keep the traction engine moving in the proper direction, the device being so connected with the front axle that when the axle is turned, the supporting wheels of the attachment will also be turned in the direction in which the engine turns.

Another object of the invention is to so construct this attachment that it may be connected with traction engines already in use and to further so construct it, that it may be disconnected from a traction engine and either put away or connected with another engine.

Another object of the invention is to provide improved guiding means for the attachment including cables connected with the front axle of the traction engine.

Another object of the invention is to so construct this device, that the various parts forming the same will be loosely connected thus permitting free play.

This invention is illustrated in the accompanying drawings, wherein:—

Figure 1 is a top plan view showing the attachment connected with a traction engine, the traction engine being shown in fragment.

Fig. 2 is a view showing the improved attachment and the forward portion of a traction engine in side elevation.

Fig. 3 is a front elevation of the improved attachment and the forward portion of the traction engine.

The cross bar 10 is provided with hooks 11 which extend through openings formed in the side walls of the bearing 12 with which front truck 14 carrying the axle 13 is pivotally connected. The chains 15 which form part of the steering gear of the traction engine 16 are connected with the forward axle 13 and it will thus be seen that the traction engine will be guided in the usual manner.

The main bar 17 of this attachment is pivotally connected with the cross bar 10 by means of the fastener 18 which passes through the connecting plates or links 19 and the second bar 20 is connected with the opposite end portion of the cross bar 10 by means of the fastener 21 which passes through the links or plates 22. The forward end portion of this second bar 20 carries plates 23 which are firmly secured to the bar by means of the fasteners 24 and extend upon opposite sides of the bar 17. These plates 24 are loosely connected with the cross plates 25 by means of rivets 26, the cross plates being connected by the bolts or pins 27 which extend along the sides of the bar 17 and will thus slidably connect the bar 20 with the bar 17. A bearing bracket 28 which carries a stub-shaft 29 for the supporting wheel 30 is carried by the head 31 of the steering lever 32, the free end portion of which is provided with openings 33 to permit the springs 34 of the steering cable 35 to be connected with the lever. A second steering lever 36 is pivotally connected with the bar 17 and has in its free end portion openings 37 so that the steering cable or chain 38 may have its terminal springs 39 connected with this lever. This lever 36 carries a link 40 which is connected with the arm 41 carried by the head of the lever 32. This arm 41 is secured to the head of the lever 32 by means of a fastener 42 and is provided with an opening to receive the shaft or standard 43 of the indicating arrow 44.

When in use the frame will be connected with the bearings 12 by means of the hooks 11 and the steering chains 35 and 38 will be connected with the front axle. As the traction engine moves across the field drawing the plow after it, the supporting wheel 30 will travel ahead of the traction engine and may be positioned in the furrow. The arrow 44 will extend parallel to the wheel and thus the driver by observing the arrow can tell if the wheel 30 is traveling in the proper direction. The guard 45 will prevent weeds and long grass from becoming tangled with the steering levers 32 and 36 thus preventing the easy movement of the levers from being interfered with. If it is desired to guide the traction engine to one side or the other, the steering gear will be moved in the proper direction, thus swinging the front axle. Movement of the front axle will draw the chain 35 if the machine is to be swung to the left and the wheel 30 will thus be turned in that direction. If the machine is to be turned to the right, the chain 38 will be drawn and swing the lever 36, which through the medium of the link 40 and arm 41 will turn the lever 32 thus swinging the wheel 30 toward the right. It will thus be seen that this wheel 30 will be turned with the axle 13 and the guiding frame swung with the traction engine. When it is no longer necessary to use this guide, the securing nuts for the hooks 11, can be removed and the device disconnected from the traction engine and after the steering chains have been disconnected from the axle, the attachment can be put away.

What is claimed is:—

1. A guiding attachment for an engine comprising a frame having a cross bar, means for connecting the cross bar with the body of an engine, side bars pivotally connected with the end portions of said cross bar, means for slidably connecting the forward end of one of said side bars with the second side bar, guiding levers pivotally connected with the second cross bar, one of the levers being pivotally mounted intermediate its length and extending beyond one side of the second side bar to provide a head, an arm extending from said head, a link connecting the arm with the second lever at a point intermediate its length, a bearing bracket connected with said head and provided with a stub shaft, a supporting wheel mounted upon said stub shaft, and guiding cables connected with the free end portions of said levers.

2. A guiding attachment for an engine comprising a frame having a longitudinally extending bar, means for pivotally connecting said bar with the body of an engine, guiding levers pivotally connected with said bar, one of said levers being pivotally mounted intermediate its length and extending beyond one side of said bar to provide a head, an arm extending from said head, a link connected with the arm and with the second lever at a point intermediate its length, means extending from said head for mounting a supporting wheel, and guiding cables connected with the free end portions of said levers.

In testimony whereof I affix my signature in presence of two witnesses.

LEOPOLD L. VIKTUREK.

Witnesses:
 E. E. PECK,
 FRANK VIKTUREK.

Copies of this patent may be obtained for five cents each, by addressing the "Commissioner of Patents, Washington, D. C."